United States Patent
Sagen

(10) Patent No.: US 9,370,978 B1
(45) Date of Patent: Jun. 21, 2016

(54) HITCH ADAPTER SYSTEM WITH DAMPING EFFECT

(71) Applicant: Robert C. Sagen, Arthur, ND (US)

(72) Inventor: Robert C. Sagen, Arthur, ND (US)

( * ) Notice: Subject to any disclaimer, the term of this patent is extended or adjusted under 35 U.S.C. 154(b) by 0 days.

(21) Appl. No.: 14/738,895

(22) Filed: Jun. 14, 2015

(51) Int. Cl.
*B60D 1/24* (2006.01)
*B60D 1/07* (2006.01)

(52) U.S. Cl.
CPC ............... *B60D 1/249* (2013.01); *B60D 1/075* (2013.01)

(58) Field of Classification Search
CPC ............ B60D 1/24; B60D 1/249; B60D 1/50
See application file for complete search history.

(56) References Cited

U.S. PATENT DOCUMENTS

| | | | | |
|---|---|---|---|---|
| 3,717,273 A * | 2/1973 | Berends | ............. | B62D 53/0821 254/124 |
| 6,170,849 B1 * | 1/2001 | McCall | ............. | B62D 53/0835 280/433 |
| 6,746,037 B1 * | 6/2004 | Kaplenski | ................ | B60D 1/50 280/439 |
| 6,913,276 B1 * | 7/2005 | Bauder | .................... | B60D 1/50 280/483 |
| 8,146,939 B2 * | 4/2012 | Jarvelin | ............. | B62D 53/0835 280/432 |
| 2007/0052204 A1 * | 3/2007 | Kaplenski | ................ | B60D 1/32 280/455.1 |
| 2010/0133780 A1 * | 6/2010 | Jarvelin | ............. | B62D 53/0871 280/400 |

* cited by examiner

*Primary Examiner* — Kevin Hurley
(74) *Attorney, Agent, or Firm* — Dave Alan Lingbeck

(57) ABSTRACT

A hitch adapter system with damping effect for controlling back and forth movement or bumping on the hitch receiver and the prime mover. The hitch adapter system with damping effect includes a lower support member having a planar bottom wall and adapted to be in communication with a prime mover; an upper support member having a planar main wall and disposed above and movable relative to the lower support member and adapted to be in communication with a trailer; a linkage assembly pivotably interconnecting the lower and upper support members; and a buffer assembly retarding and cushioning the movement of the upper support member relative to the lower support member.

11 Claims, 5 Drawing Sheets

HITCH ADAPTER SYSTEM WITH DAMPING EFFECT

BACKGROUND OF THE INVENTION

1. Field of the Invention

The present invention relates to hitch connectors and more particularly pertains to a new hitch adapter system with damping effect for controlling back and forth movement or the bumping effect on the hitch receiver and the prime mover.

2. Description of the Prior Art

The use of hitch connectors is known in the prior art. More specifically, hitch connectors heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a trailer hitch isolation assembly that attaches to the tongue of a fifth wheel trailer and that provides a moveable connection between a tow vehicle and the trailer. The hitch assembly includes a floating hitch attachment member such as a king pin, which is adapted to be attached to a tow vehicle. The hitch isolation assembly allows the hitch attachment member to move as least vertically relative to the tow vehicle to which the hitch assembly is connected. One or more air springs connect the floating hitch attachment to the frame of the trailer. Another prior art includes an articulated air suspended hydraulic-dampened fifth wheel hitch coupling device for isolating the front of a fifth wheel or goose neck trailer hitch from the shock of bumps in the road and the inertia of movement of the trailer. Two inflatable air springs operatively connected to the pressurized air system of the tow vehicle eliminates vertical fifth wheel load from being transferred from the trailer to the tow vehicle. Also, another prior art includes a trailer hitch head operable to receive a cooperating portion of a trailer, the trailer hitch head adapted to be slidable and rotatable relative to the vehicle about an axis of rotation, first and second parallel spaced part guides fixedly located relative to the vehicle, and a body affixed to and rotatable with the trailer hitch head, the body having a center of rotation about the axis and a distal surface adapted to engage either of the first or second guides when the body is rotated relative to the first and second guides. Further, another prior art includes a capture plate for preventing rotation between a trailer and a hitch assembly. The hitch assembly mounts on a vehicle, and is preferably a sliding hitch assembly. The capture plate has a lip which mates with the pin box of a fifth wheel trailer, the lip prevents rotation between the trailer and the capture plate. While these devices fulfill their respective, particular objectives and requirements, the aforementioned patents do not disclose a new hitch adapter system with damping effect.

SUMMARY OF THE INVENTION

The general purpose of the present invention, which will be described subsequently in greater detail, is to provide a new hitch adapter system with damping effect which has many of the advantages of the hitch connecters mentioned heretofore and many novel features that result in a new hitch adapter system with damping effect which is not anticipated, rendered obvious, suggested, or even implied by any of the prior art hitch connectors, either alone or in any combination thereof. The present invention includes a lower support member having a planar bottom wall and adapted to be in communication with a prime mover; an upper support member having a planar main wall and disposed above and movable relative to the lower support member and adapted to be in communication with a trailer; a linkage assembly pivotably interconnecting the lower and upper support members; and a buffer assembly retarding and cushioning the movement of the upper support member relative to the lower support member. None of the prior art includes the combination of the elements of the present invention.

There has thus been outlined, rather broadly, the more important features of the hitch adapter system with damping effect in order that the detailed description thereof that follows may be better understood, and in order that the present contribution to the art may be better appreciated. There are additional features of the invention that will be described hereinafter and which will form the subject matter the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new hitch adapter system with damping effect which has many of the advantages of the hitch connectors mentioned heretofore and many novel features that result in a new hitch adapter system with damping effect which is not anticipated, rendered obvious, suggested, or even implied by any of the prior art hitch connectors, either alone or in any combination thereof.

Still another object of the present invention is to provide a new hitch adapter system with damping effect for controlling the jerking impact or the bumping effect on the hitch receiver and the prime mover.

Still yet another object of the present invention is to provide a new hitch adapter system with damping effect that substantially controls the back forth movement of the trailer as the prime mover encounters bumpy terrain in multiple steps using multiple cushions and airbags.

Even still another object of the present invention is to provide a new hitch adapter system with damping effect that gradually cushions and dampens the effect the trailer has on the hitch receiver and prime mover upon the prime mover slowing down or stopping or encountering rough terrain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
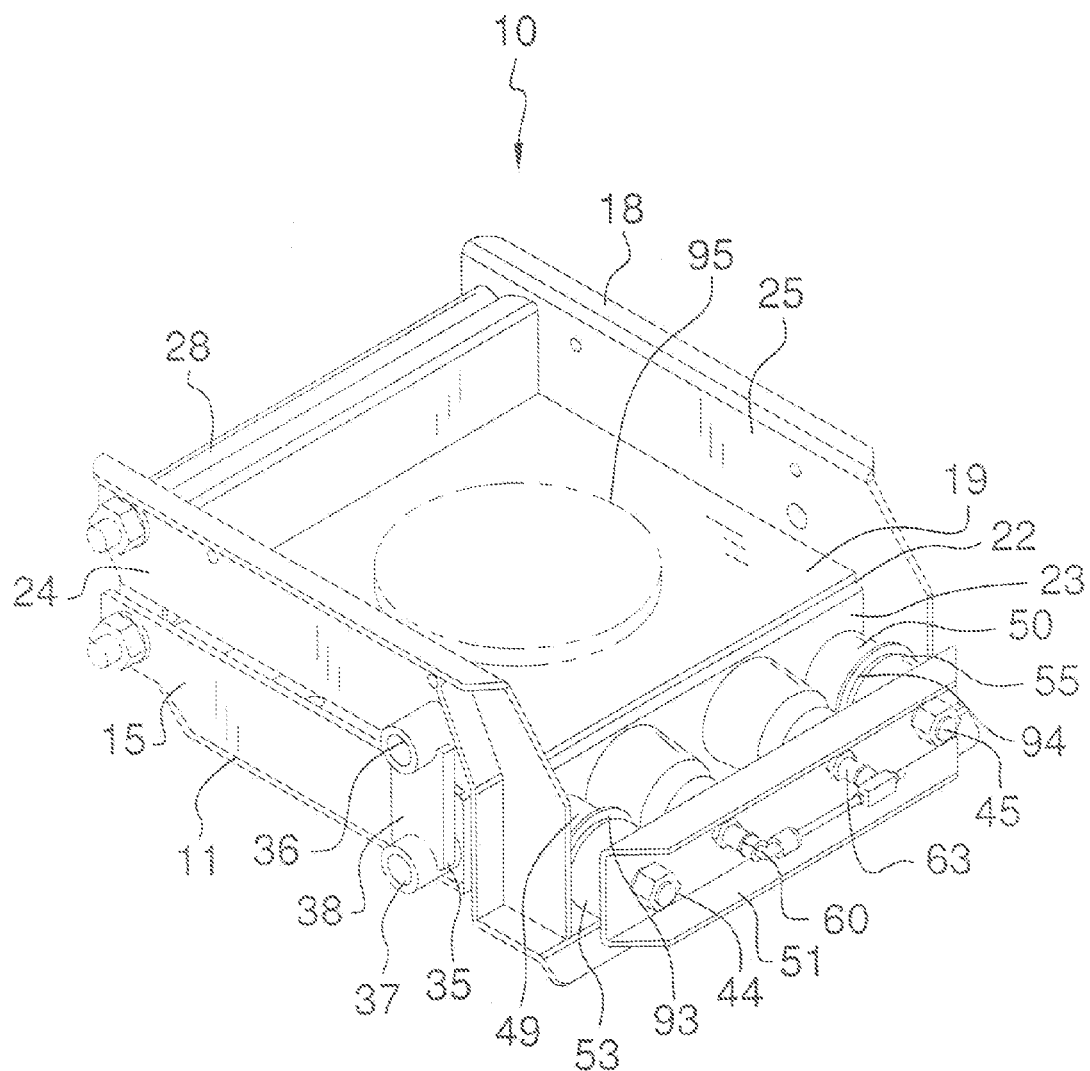
FIG. 1 is a top rear perspective view of a new hitch adapter system with damping effect according to the present invention.
Figure 2:
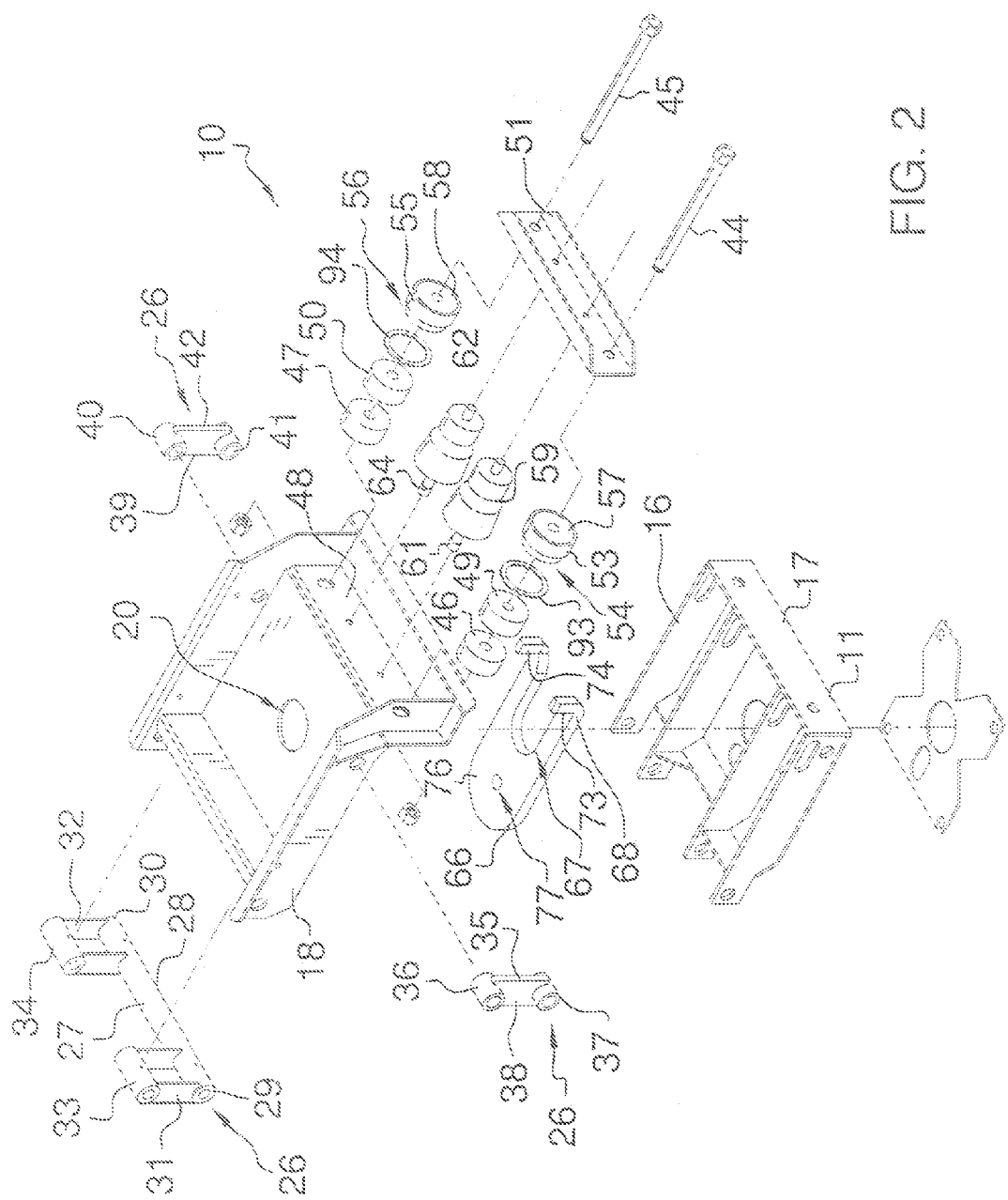
FIG. 2 is a top exploded perspective view of the present invention.
Figure 3:
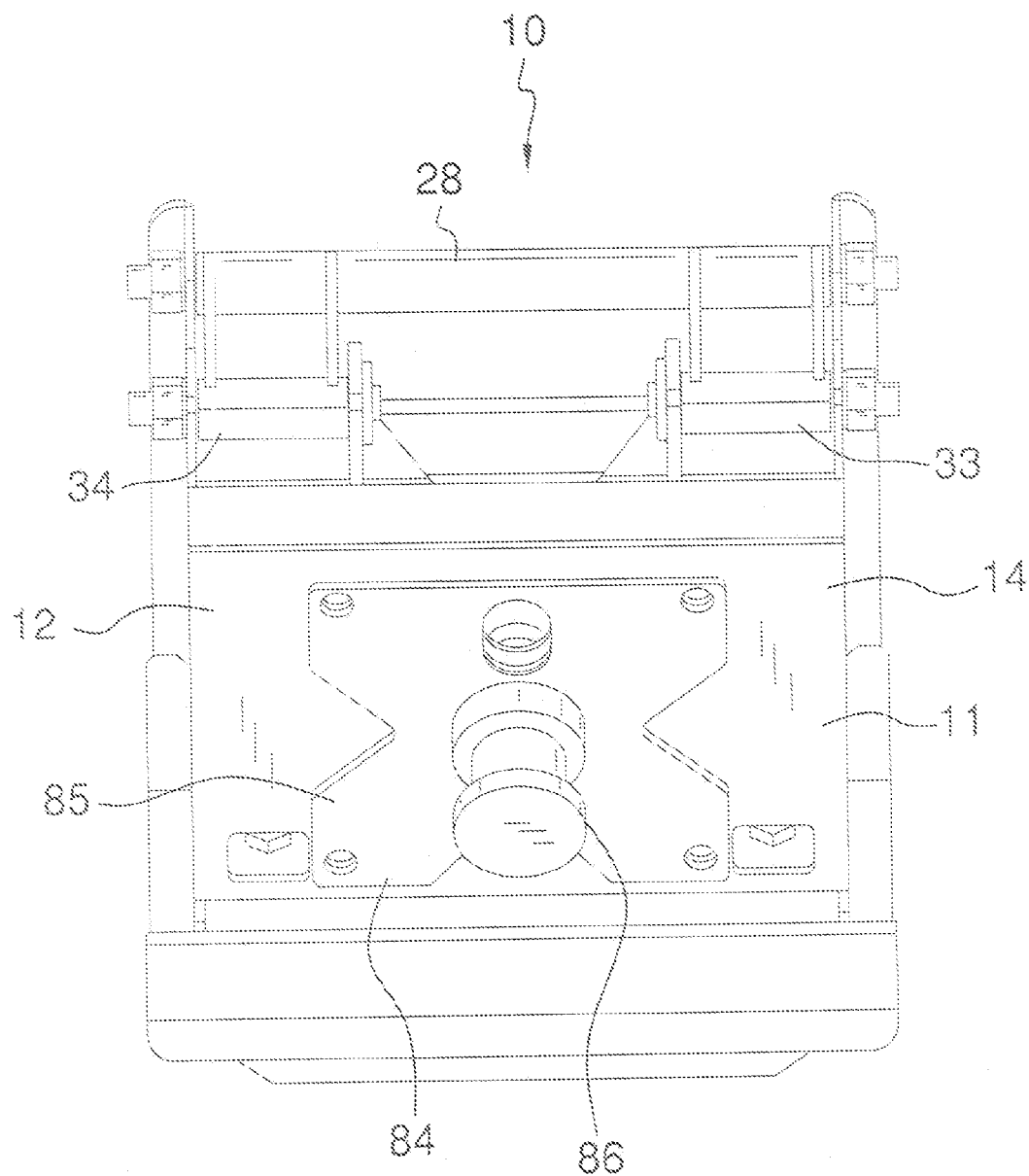
FIG. 3 is a bottom front perspective view of the present invention.

With reference now to the drawings, and in particular to FIGS. 1 through 6 thereof, a new hitch adapter system with damping effect embodying the principles and concepts of the present invention and generally designated by the reference numeral 10 will be described.

As best illustrated in FIGS. 1 through 6, the hitch adapter system with damping effect 10 generally may comprise a lower support member 11 having a planar bottom wall 12 and adapted to be in communication with a prime mover and may also comprise an upper support member 18 having a planar main wall 19 and spaced above and movable relative to the lower support member 11 and adapted to be in communication with a trailer, a may further comprise a linkage assembly 26 pivotably and conventionally interconnecting the lower and upper support members 11, 18, and may also comprise a buffer assembly 43 retarding and cushioning movement of the upper support member 18 relative to the lower support member 11.

As shown in FIGS. 1 through 6, the lower support member 11 may include first and second side walls 15, 16 and a back wall 17 conventionally attached to and along a perimeter of the bottom wall 12 and may further have holes disposed through the first and second side walls 15, 16 and the back wall 17. The upper support member 18 may include first and second side walls 24, 25 conventionally attached to and along a perimeter of the main wall 19 and may also include a back wall 23 depending from a back edge 22 of the main wall 19. The main wall 19 may have an opening 20 centrally disposed therethrough and adapted to receive therethrough a kingpin 95 connected to the trailer.

As shown in FIGS. 1 through 6, the linkage assembly 26 may include a stabilizing linkage member 27 pivotably and conventionally interconnecting the upper and lower support members 11, 18 with fastening members to maintain vertical orientation and prevent swaying of the upper support member 18 relative to the lower support member 11 with the main wall 19 capable of moving parallel forwardly and backwardly relative to the bottom wall 12. The stabilizing linkage member 27 may include an elongate bushing 28 disposed between and pivotably coupled with fastening members to the first and second side walls 24, 25 of the upper support member 18 and may also include brackets 31, 32 conventionally attached and welded near opposed ends 29, 30 of the elongate bushing 28 and man further include a pair of bushing members 33, 34 conventionally attached and welded to the brackets 31, 32 one near each of the opposed ends 29, 30 of the elongate bushing 28 with one of the bushing members 33 pivotably and conventionally coupled to the first side wall 15 of the lower support member 11 and another of the bushing members 34 pivotably and conventionally coupled to the second side wall 16 of the lower support member 11. The linkage assembly 26 may further include a first linkage member 35 pivotably and conventionally coupled to the first side wall 15 of the lower support member 11 and to the first side wall 24 of the upper support member 18, and may also include a second linkage member 39 pivotably and conventionally coupled to the second side wall 16 of the lower support member 11 and to the second side wall 25 of the upper support member 18. The first and second linkage members 35, 39 each may include an upper bushing member 36, 40 and a lower bushing member 37, 41 spaced apart with a rigid spacer member 38, 42 welded to and conventionally interconnecting the upper and lower bushing members 36, 37, 40, 41.

As illustrated in FIGS. 1 through 6, the buffer assembly 43 may include fasteners 44, 45 spaced apart and extending through holes in the back walls 17, 23 of the upper and lower support members 11, 18, and may also include first cushions 46, 47 each conventionally supported about a respective fastener 44, 45 and disposed between the back wall 17 of the lower support member 11 and the back wall 23 of the upper support member 18. The buffer assembly 43 may further include second cushions 49, 50 each conventionally supported about a respective fastener 44, 45 and contactable to an outer side 48 of the back wall 23 of the upper support member 18. The buffer assembly 43 may also include a guide plate 51 having an inner side 52 facing the back wall 23 of the upper support member 18 with the fasteners 44, 45 extending through holes in the guide plate 51, and may further include hollow tubes 53, 55 conventionally attached and welded to the inner side 52 of the guide plate 51 and each coaxially aligned with a respective fastener 44, 45 and having open ends 54, 56. The buffer assembly 43 may also include third cushions 57, 58 each conventionally supported about a respective fastener 44, 45 and disposed in a respective hollow tube 53, 55 through the open end 54, 56, and may further include stoppers 93, 94 such as washers with each conventionally supported about a respective fastener 44, 45 and disposed between a respective second and third cushions 49, 50, 57, 58 and contactable with a respective hollow tube 53, 55 to limit compression imposed upon and stiffen the respective third cushion 57, 58 to control movement of the trailer. The first, second and third cushions 46, 47, 49, 50, 57, 58 supported about a respective fastener 44, 45 may be linearly arranged with respect to one another to control the movement and impact in multiple steps of the trailer upon the hitch receiver and prime mover. The buffer assembly 43 may further include pressure adjustable air bags 59, 62 conventionally disposed between the guide plate 51 and the back wall 23 of the upper support member 18 with air conduits 60, 63 each conventionally attached to a respective air bag 59, 62 and extending through holes in the guide plate 51 and with mounts 61, 64 each conventionally attached to a respective air bag 59, 62 and disposed through the back wall 23 of the upper support member 18 to control low impact jerking of the trailer.

Figure 4:
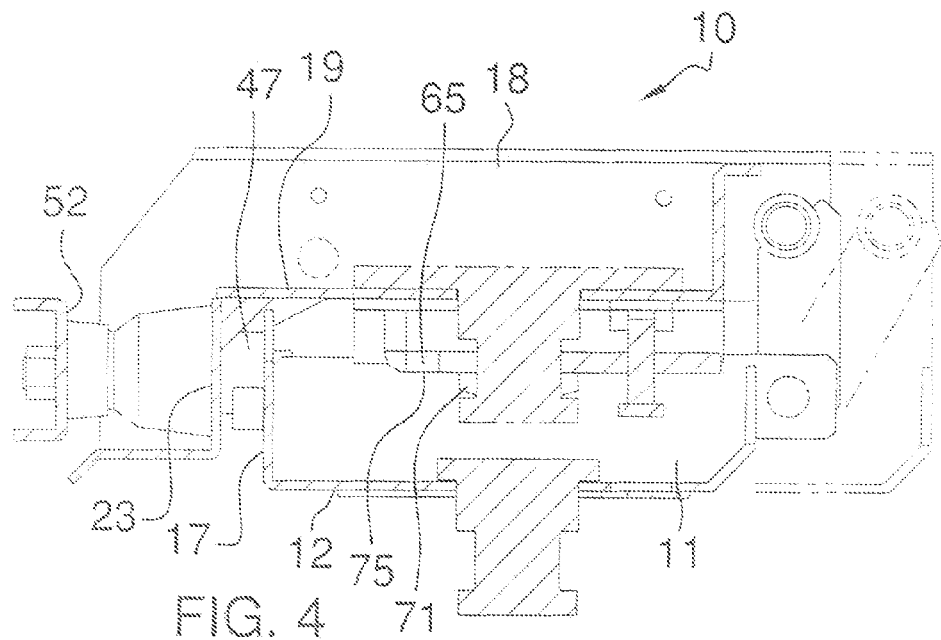
FIG. 4 is a side cross-sectional view of the present invention.
Figure 5:
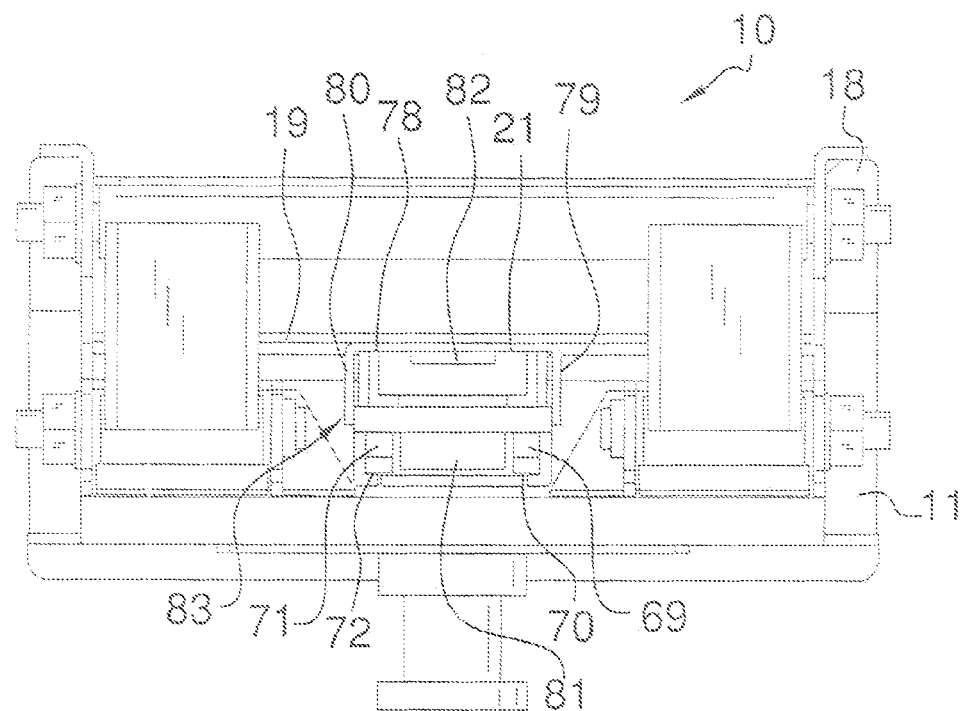
FIG. 5 is a rear elevation view of the present invention.

As shown in FIGS. 1, 4 and 5, the hitch adapter system with damping effect 10 generally may also comprise a lock 65 removably disposed between the bottom wall 12 of the lower support member 11 and the main wall 19 of the upper support member 18 and adapted to engage and secure the kingpin of the trailer disposed through the opening 20 of the upper support member 18. The lock 65 may include an elongate planar main portion 66 with a longitudinal slot 67 disposed therein through an end edge 68 thereof and adapted to receive the kingpin therein, and may also include rocker members 69, 71 spaced apart and conventionally attached to and depending from a bottom side 75 and extending longitudinally of the main portion 66 and having a downwardly bowed bottom end 70, 72 adapted to rock upon a flange of the kingpin. The lock 65 may further include guide members 73, 74 conventionally disposed upon and integrally extending upwardly from a top side 76 of the main portion 66 at the end edge 68 of the main portion 66 on either side of the longitudinal slot 67, and may also include a hole 77 disposed through the main portion 66 with the guide members 73, 74 contactable to the main wall 19 of the upper support member 18 when the lock 65 is fastened to the upper support member 18 through the hole 77 in the lock 65. The upper support member 18 may also include a lock guide 78 conventionally attached to and depending from a bottom side 21 of the main wall 19 and having side walls 79, 80 and an end wall 82 disposed about the opening 20 through the main wall 19 and also having a bottom wall 81 spaced from the main wall 19 and disposed below the opening 20 through the main wall 19 with the lock guide 78 having an open end 83 for receiving the lock 65.

As shown in FIGS. 1 through 5, a hitch kingpin adapter 84 may be fastenable to a bottom side 14 of the bottom wall 12 of the lower support member 11 and may have a mounting plate 85 fastenable with fastening members to the lower support member 11 and may also have a kingpin member 86 conventionally attached to and depending from the mounting plate 85 and adapted to be fastenably received in a hitch receiver mounted upon a prime mover.

Figure 6:
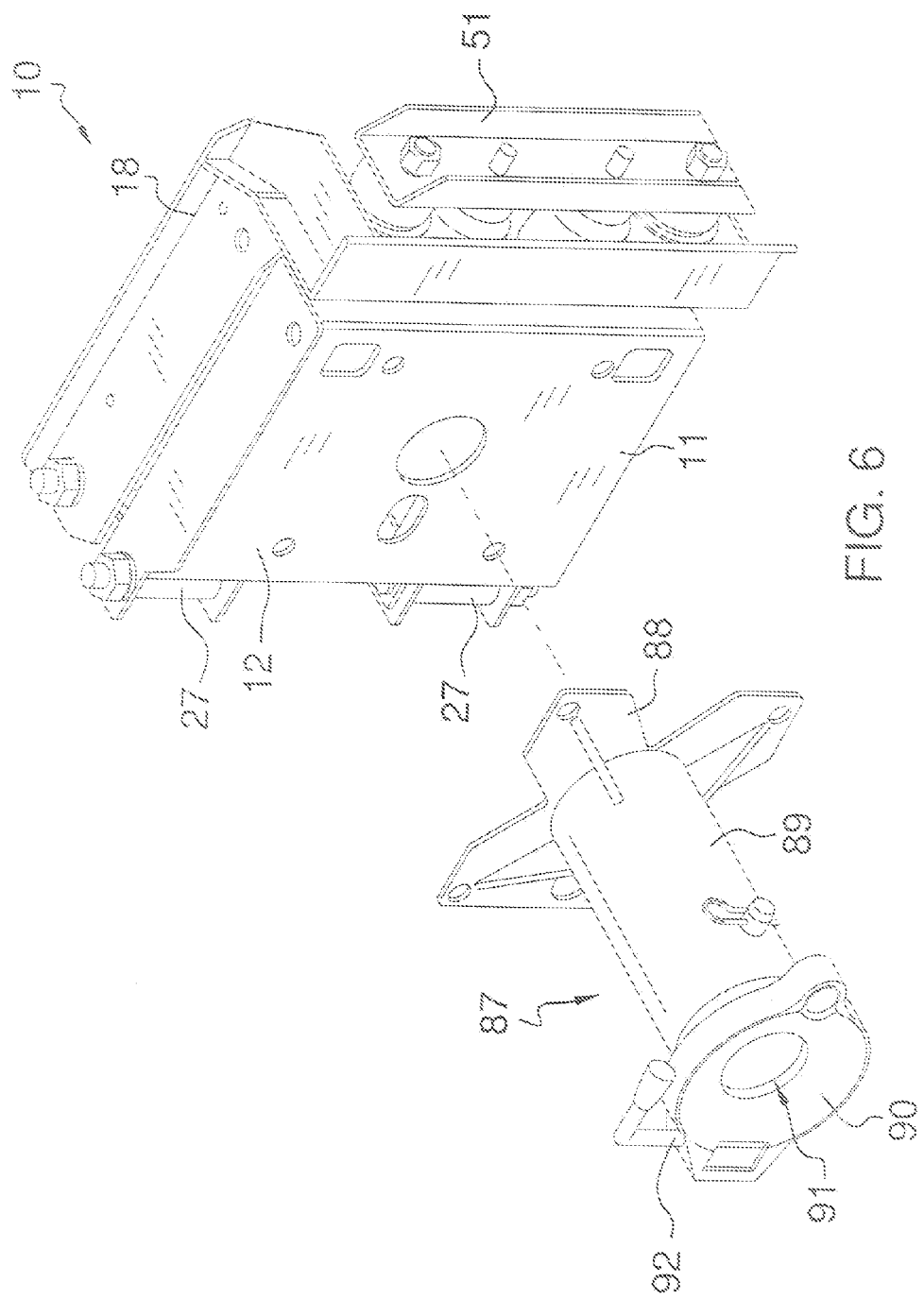
FIG. 6 is a partial bottom exploded perspective view of a second embodiment of the present invention.

As another embodiment as shown in FIG. 6, a hitch ball adapter 87 may be fastenable to a bottom side 14 of the bottom wall 12 of the lower support member 11 and may have a mounting plate 88 conventionally fastenable to the lower support member 11 may also have a tubular column 89 with a bore 91 disposed in a bottom end 90 of the tubular column 89 and adapted to receive a hitch ball mounted to a prime mover with a locking member 92 disposed in the bore 91 for engaging the hitch ball.

In use, the hitch adapter system with damping effect 10 may be disposed between the trailer and the prime mover with the hitch kingpin 95 of the trailer disposed through the opening 20 of the main wall 19 of the upper support member 18 and the lock 65 engaging and securing the kingpin to the hitch adapter system 10 below the upper support member 18, and either the hitch kingpin adapter 84 or the hitch ball adapter 87 either of which is fastened to the lower support member 11 is received in or receives the hitch receiver which is mounted upon the prime mover. The linkage assembly 26 allows for the upper support member 18 to move parallel forwardly and rearwardly relative to the lower support member 11 while the buffer assembly 43 dampens and cushions the jerking impact of the trailer upon the prime mover when slowing down and stopping or riding over bumps on the road in multiple steps to maintain the back and forth movement of the trailer relative to the prime mover. The first cushions 46, 47 buffer the forward movement of the trailer relative to the prime mover as the prime mover brakes or stops. The second and third cushions 49, 50, 57, 58 buffer the jerking impact of the trailer upon the prime mover as the prime mover rides over bumps on the road or climbing hills. The third cushions 57, 58 stiffen as they are compressed in the hollow tubes 53, 55 with the second cushions 49, 50 doubling the spring rate to effectively control the movement of the trailer. Additionally, other embodiments may include the lower support member 11 conventionally attached directly to the prime mover with the hitch kingpin of the trailer secured to the upper support member 18, or the upper support member 18 may be directly fastened to the trailer with either of the hitch kingpin adapter 84 or the hitch ball adapter 87 received in or receiving the hitch receiver which is attached to the prime mover.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the hitch adapter system with damping effect. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch adapter system with damping effect comprising:
a lower support member having a planar bottom wall and adapted to be in communication with a prime mover, wherein the lower support member includes first and second side walls and a back wall attached to the bottom wall;
an upper support member having a planar main wall and spaced above and movable relative to the lower support member and adapted to be in communication with a trailer, wherein the upper support member includes first and second side walls attached to the main wall and also includes a back wall depending from a back edge of the main wall;
a linkage assembly pivotably interconnecting the lower and upper support members; and
a buffer assembly retarding and cushioning movement of the upper support member relative to the lower support member, wherein the buffer assembly includes fasteners spaced apart and extending through the back walls of the upper and lower support members, and also includes first cushions each supported about a respective said fastener and disposed between the back wall of the lower support member and the back wall of the upper support member.

2. The hitch adapter system with damping effect as described in claim 1, wherein the buffer assembly further includes second cushions each supported about a respective said fastener and contactable to an outer side of the back wall of the upper support member.

3. The hitch adapter system with damping effect as described in claim 2, wherein the buffer assembly also includes a guide plate having an inner side facing the back wall of the upper support member with the fasteners extending through the guide plate, and further includes hollow tubes attached to the inner side of the guide plate and each coaxially aligned with a respective said fastener and having an open end.

4. The hitch adapter system with damping effect as described in claim 3, wherein the buffer assembly also includes third cushions each supported about a respective said fastener and disposed in a respective said hollow tube through the open end, and further includes stoppers each supported about a respective said fastener and disposed between a respective said second and third cushions and contactable with a respective said hollow tube to limit compression imposed upon and stiffen the respective said third cushion to control movement of the trailer.

5. The hitch adapter system with damping effect as described in claim 3 wherein the buffer assembly further includes pressure adjustable air bags disposed between the guide plate and the back wall of the upper support member with air conduits each attached to a respective said air bag and extending through the guide plate and with mounts each attached to a respective said air bag and disposed through the back wall of the upper support member to control low impact jerking of the trailer.

6. A hitch adapter system with damping effect comprising:
a lower support member having a planar bottom wall and adapted to be in communication with a prime mover, wherein the lower support member includes first and second side walls and a back wall attached to the bottom wall;
an upper support member having a planar main wall and spaced above and movable relative to the lower support member and adapted to be in communication with a trailer, wherein the upper support member includes first and second side walls attached to the main wall and also includes a back wall depending from a back edge of the main wall, wherein the main wall has an opening centrally disposed therethrough and adapted to receive therethrough a kingpin connected to a trailer;
a linkage assembly pivotably interconnecting the lower and upper support members;
a buffer assembly retarding and cushioning movement of the upper support member relative to the lower support member; and
a lock removably disposed between the bottom wall of the lower support member and the main wall of the upper support member and adapted to engage and lock the kingpin of the trailer disposed through the opening of the upper support member.

7. The hitch adapter system with damping effect as described in claim 6, wherein the lock includes an elongate planar main portion with a longitudinal slot disposed therein through an end edge thereof and adapted to receive the kingpin therein, and also includes rocker members spaced apart and depending from a bottom side and extending longitudinally of the main portion and having a downwardly bowed bottom end adapted to rock upon a flange of the kingpin.

8. The hitch adapter system with damping effect as described in claim 6, wherein the lock further includes guide members disposed upon and extending upwardly from a top side of the main portion at the end edge of the planar member on either side of the slot, and also includes a hole through the main portion with the guide members contactable to the main wall of the upper support member when the lock is fastened to the upper support member through the hole in the lock.

9. The hitch adapter system with damping effect as described in claim 6, wherein the upper support member also includes a lock guide depending from a bottom side of the main wall and having side walls and an end wall disposed about the opening through the main wall and also having a bottom wall spaced from the main wall and disposed below the opening through the main wall with the lock guide having an open end for receiving the lock.

10. A hitch adapter system with damping effect comprising:
a lower support member having a planar bottom wall and adapted to be in communication with a prime mover;
an upper support member having a planar main wall and spaced above and movable relative to the lower support member and adapted to be in communication with a trailer;
a linkage assembly pivotably interconnecting the lower and upper support members;
a buffer assembly retarding and cushioning movement of the upper support member relative to the lower support member; and
a hitch kingpin adapter fastenable to a bottom side of the bottom wall of the lower support member and having a mounting plate fastenable to the lower support member and also having a kingpin member depending from the mounting plate and adapted to be fastenably received in a hitch receiver mounted upon a prime mover.

11. A hitch adapter system with damping effect comprising:
a lower support member having a planar bottom wall and adapted to be in communication with a prime mover;
an upper support member having a planar main wall and spaced above and movable relative to the lower support member and adapted to be in communication with a trailer;
a linkage assembly pivotably interconnecting the lower and upper support members;
a buffer assembly retarding and cushioning movement of the upper support member relative to the lower support member; and
a hitch ball receiver adapter fastenable to a bottom side of the bottom wall of the lower support member and having a mounting plate fastenable to the lower support member also having a tubular column depending from the mounting plate with a bore disposed in a bottom end of the tubular column and adapted to receive a hitch ball mounted to a prime mover with a locking member disposed in the bore for engaging the hitch ball.

* * * * *